United States Patent
Yokota et al.

(10) Patent No.: US 9,712,012 B2
(45) Date of Patent: Jul. 18, 2017

(54) ROTARY ELECTRIC MACHINE HAVING ARMATURE WINDINGS WITH REDUCED WIDTH PORTIONS

(71) Applicant: Mitsubishi Electric Corporation, Chiyoda-ku, Tokyo (JP)

(72) Inventors: Hirohisa Yokota, Chiyoda-ku (JP); Atsushi Sakaue, Chiyoda-ku (JP); Hironori Tsuiki, Chiyoda-ku (JP); Tatsuro Hino, Chiyoda-ku (JP); Shinkichi Sawa, Chiyoda-ku (JP); Masashi Nakamura, Chiyoda-ku (JP); Shogo Okamoto, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 336 days.

(21) Appl. No.: 14/252,385

(22) Filed: Apr. 14, 2014

(65) Prior Publication Data
US 2015/0171690 A1    Jun. 18, 2015

(30) Foreign Application Priority Data

Dec. 16, 2013 (JP) .................................. 2013-258813

(51) Int. Cl.
H02K 3/34 (2006.01)
H02K 3/24 (2006.01)
(Continued)

(52) U.S. Cl.
CPC ................ *H02K 3/24* (2013.01); *H02K 3/12* (2013.01); *H02K 3/38* (2013.01)

(58) Field of Classification Search
CPC .. H02K 3/34; H02K 3/12; H02K 3/24; H02K 3/28; H02K 9/005; H02K 9/00
(Continued)

(56) References Cited

U.S. PATENT DOCUMENTS

| 3,098,941 A * | 7/1963 | Willyoung | H02K 3/24 310/262 |
| 2001/0040418 A1 * | 11/2001 | Higashino | H02K 3/38 310/52 |
| 2012/0274156 A1 * | 11/2012 | Chamberlin | H02K 3/38 310/58 |

FOREIGN PATENT DOCUMENTS

| CN | 103036343 A | 4/2013 |
| JP | T13-748 U | 6/1926 |

(Continued)

OTHER PUBLICATIONS

Communication dated Oct. 28, 2014 from the Japanese Patent Office in counterpart Japanese Patent Application No. 2013-258813.

(Continued)

*Primary Examiner* — Michael Andrews
(74) *Attorney, Agent, or Firm* — Sughrue Mion, PLLC; Richard C. Turner

(57) ABSTRACT

An armature winding includes a plurality of distributed winding bodies that are each produced by winding a single conductor wire that is insulated, jointless, and continuous, and that has a constant cross-sectional area perpendicular to a longitudinal direction, the conductor wires include first through third coil end portions that link first through fourth rectilinear portions and first through fourth rectilinear portions, and are formed such that radial widths w' of the first through fourth rectilinear portions are wider than radial widths w of the first through third coil end portions, and first gaps are formed between radially adjacent coil end portions to allow a cooling medium to pass through the first gaps.

8 Claims, 15 Drawing Sheets

(51) Int. Cl.
*H02K 3/12* (2006.01)
*H02K 3/38* (2006.01)

(58) Field of Classification Search
USPC ............ 310/58, 52, 179, 195, 198, 201–208
See application file for complete search history.

(56) References Cited

FOREIGN PATENT DOCUMENTS

| JP | 2001245454 A | 9/2001 |
| JP | 200789273 A | 4/2007 |
| JP | 2013-094019 A | 5/2013 |

OTHER PUBLICATIONS

Communication dated Sep. 5, 2016, issued by the State Intellectual Property Office of the P.R.C. in corresponding Chinese Application No. 201410276986.5.

\* cited by examiner

FIG. 9
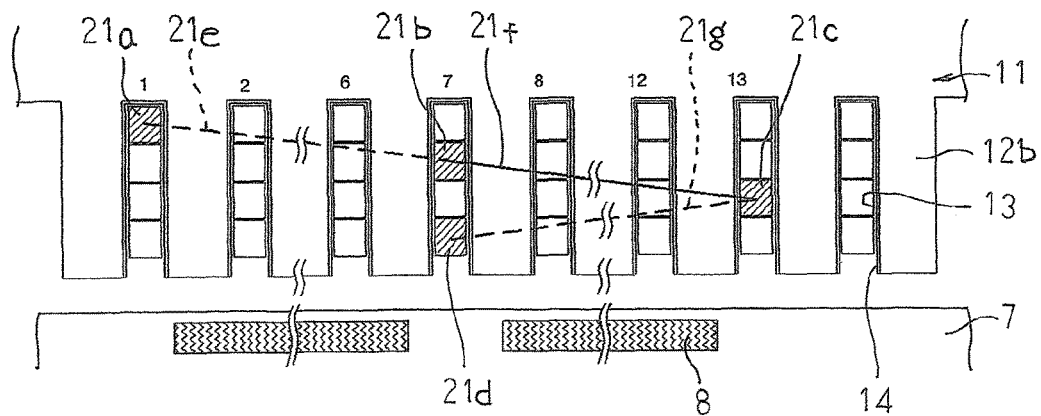
FIG. 10
FIG. 11A            FIG. 11B
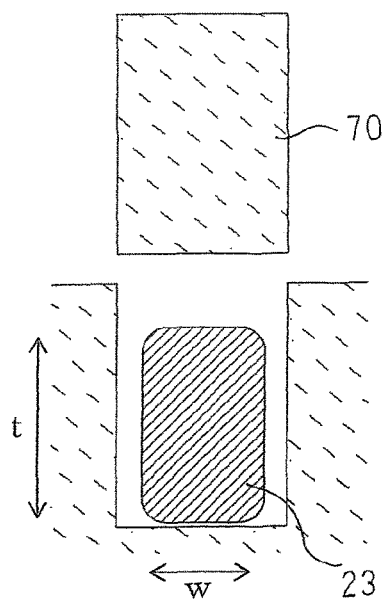
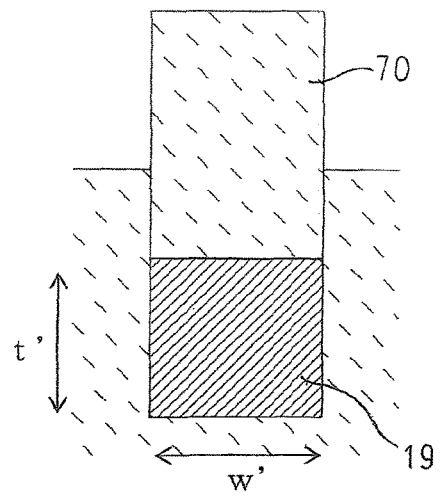

ROTARY ELECTRIC MACHINE HAVING ARMATURE WINDINGS WITH REDUCED WIDTH PORTIONS

BACKGROUND OF THE INVENTION

1. Field of the Invention

The present invention relates to a rotary electric machine such as an electric motor or a generator, for example, and particularly relates to a shape of a winding body that constitutes an armature winding.

2. Description of the Related Art

In recent years, compactness, high output, and high quality are required in rotary electric machines such as electric motors or generators. In high-output rotary electric machines of this kind, since high voltages are applied, it has been necessary to increase insulation performance by increasing the thickness of insulating material that covers conductor wires that are mounted into the armature core because electric potential differences that arise between the conductor wires, particularly in coil ends, are increased. However, when the thickness of the insulating material is increased, the ratio occupied by the conductor wires inside the slots (the space factor) is reduced, reducing the efficiency of the rotary electric machine.

In consideration of such conditions, conventional rotary electric machines have been proposed in which thin insulating coating layers are disposed on rectilinear portions of conductor wires that are housed inside slots, which have smaller electric potential differences, and thick insulating coating layers are disposed on coil end portions, which have larger electric potential differences, to increase space factor inside the slots while ensuring required insulation performance in the coil end portions (see Patent Literature 1, for example).

CITATION LIST

Patent Literature

[Patent Literature 1] Japanese Patent Laid-Open No. 2013-94019 (Gazette)

In conventional rotary electric machines such as that described in Patent Literature 1, because thick insulating coating layers are disposed on the coil end portions, one problem has been that the coil end portions overlap with each other radially with the insulating coating layers interposed, enlarging the coil ends radially. In addition, because the thick insulating coating layers are disposed on all of the coil end portions, another problem has been that gaps between the coil end portions are filled by the insulating coating layer, making it hard for a cooling medium to flow between the coil end portions, thereby making the cooling of the coil ends deficient.

SUMMARY OF THE INVENTION

The present invention aims to solve the above problems and an object of the present invention is to provide a rotary electric machine that can ensure required insulation performance in coil end portions, and also facilitate flow of a cooling medium between the coil end portions, to enable coil ends to be cooled effectively by adapting a shape of a conductor wire so as to ensure gaps between the coil end portions and to suppress increases in radial dimensions of the coil ends.

In order to achieve the above object, according to one aspect of the present invention, there is provided a rotary electric machine including an armature that includes: an annular armature core in which slots are arranged circumferentially; and an armature winding that is mounted onto the armature core. The armature winding includes a plurality of distributed winding bodies that are each produced by winding a single conductor wire that is insulated, jointless, and continuous, and that has a constant cross-sectional area perpendicular to a longitudinal direction; the conductor wires are configured by alternately arranging rectilinear portions and coil end portions in a longitudinal direction of the conductor wires, the rectilinear portions being inserted into the slots, and the coil end portions linking of pairs of rectilinear portions inserted into the slots positioned on two sides of a plurality of circumferentially consecutive teeth, a plurality of the rectilinear portions are housed inside the slots so as to line up in a single column in a radial direction, a radial width of the rectilinear portions is formed so as to be wider than a radial width of the coil end portions, and a first gap is formed between radially adjacent coil end portions to allow a cooling medium to pass through the first gap.

According to the present invention, conductor wires are formed such that rectilinear portions and coil end portions are lined up alternately in a longitudinal direction of the conductor wire, the rectilinear portions being inserted into slots and the soil end portions linking pairs of rectilinear portions inserted into the slots positioned on two sides of a plurality of teeth, and when mounted onto an armature core, radial widths of the rectilinear portions are wider than radial widths of the coil end portions, and first gaps are formed between radially adjacent coil end portions. Thus, insulation performance that is required in the coil end portions can be ensured without increasing the thickness of insulating material on the coil end portions. Furthermore, because a cooling medium is passed through the first gaps between the coil end portions, the coil end portions can be cooled effectively.

BRIEF DESCRIPTION OF THE DRAWINGS

FIG. 9 is a diagram that explains a mounted state of the winding body onto the armature core in the rotary electric machine according to Embodiment 1 of the present invention;

FIG. 10 is a plan that shows a conductor strand that constitutes a raw material of the conductor wire that constitutes the winding body in the rotary electric machine according to Embodiment 1 of the present invention;

FIGS. 11A and 11B cross section that explain a step of forming a rectilinear portion of the winding body in the rotary electric machine according to Embodiment 1 of the present invention;

DETAILED DESCRIPTION OF THE PREFERRED EMBODIMENTS

Preferred embodiments of a rotary electric machine according to the present invention will now be explained with reference to the drawings.

Embodiment 1

Figure 1:
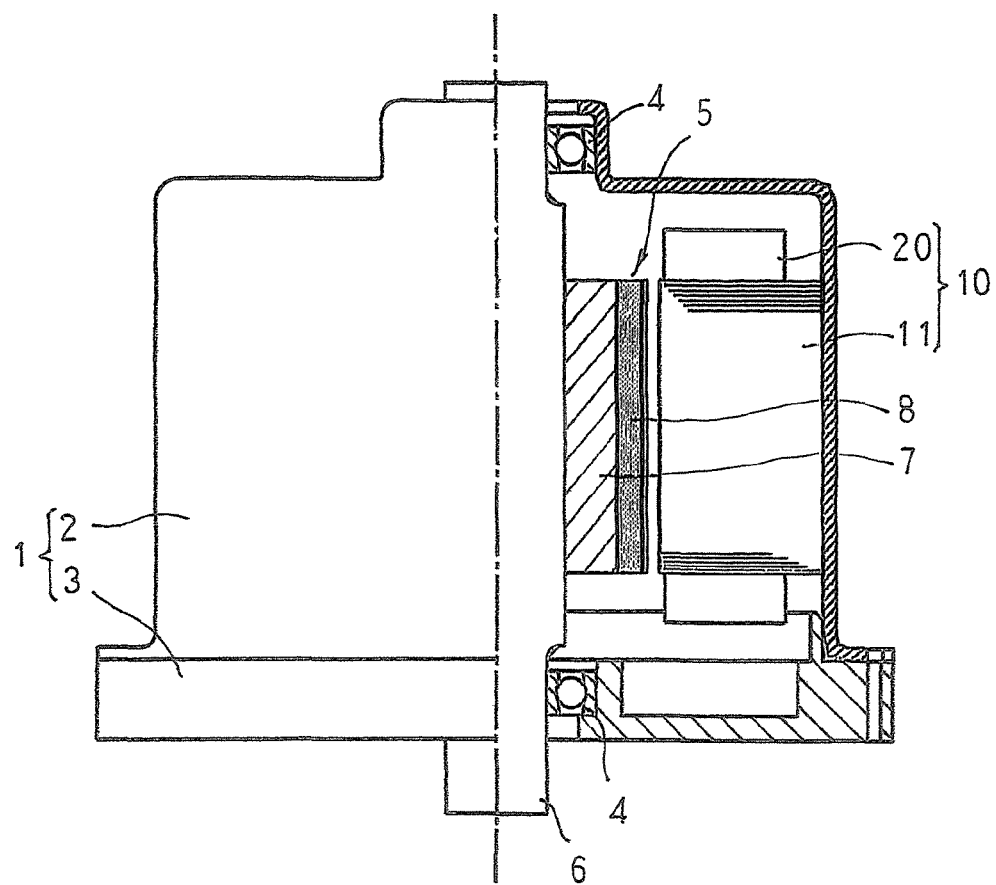
FIG. 1 is a half section that shows a rotary electric machine according to Embodiment 1 of the present invention.
Figure 2:
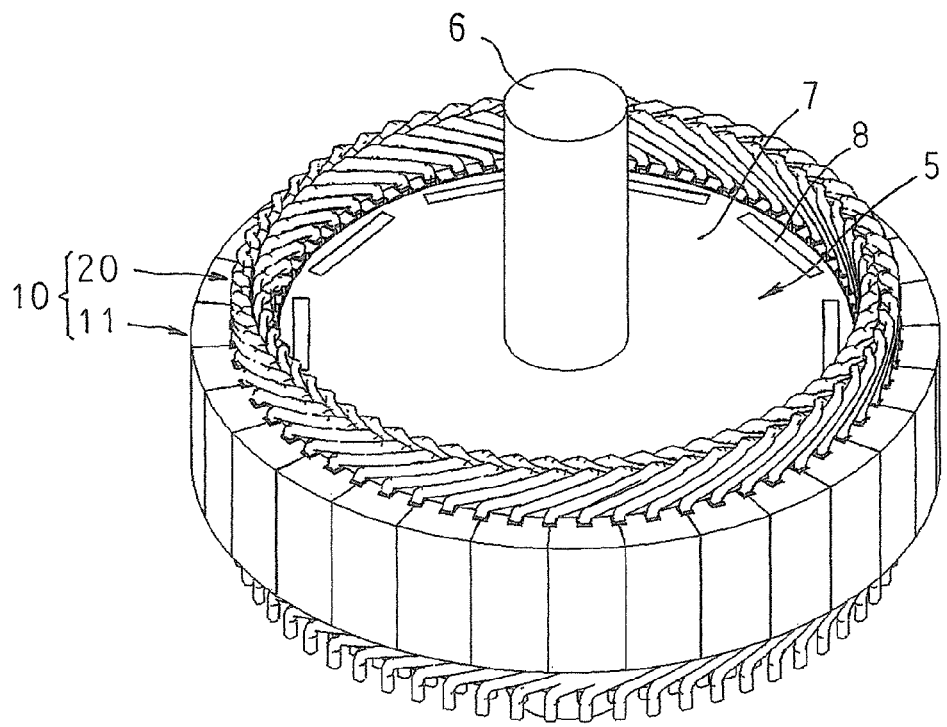
FIG. 2 is an oblique projection that shows part of the rotary electric machine according to Embodiment 1 of the present invention.
Figure 3:
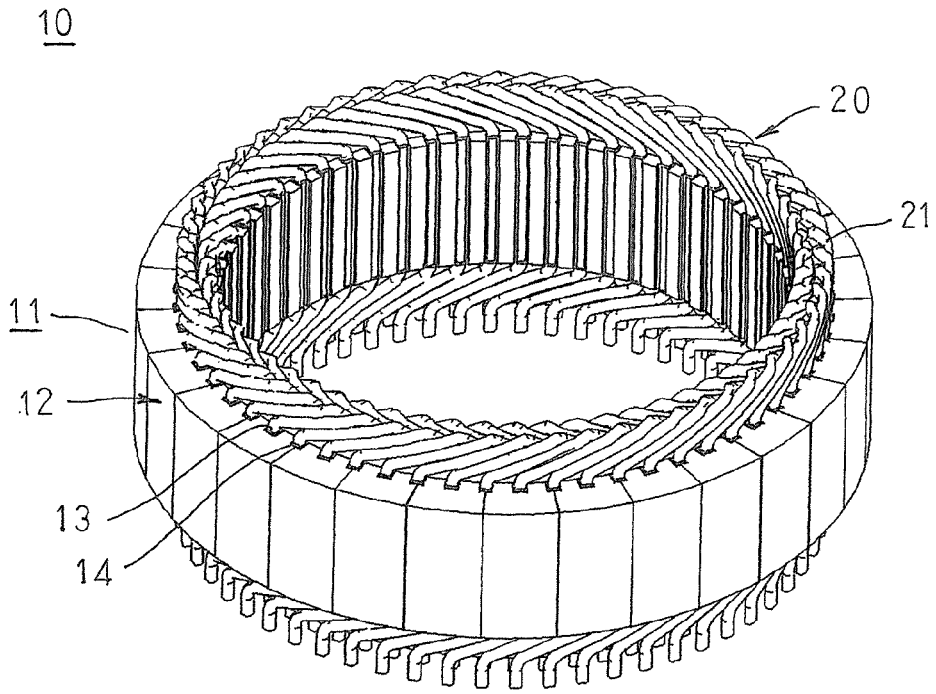
FIG. 3 is an oblique projection that shows an armature in the rotary electric machine according to Embodiment 1 of the present invention.
Figure 4:
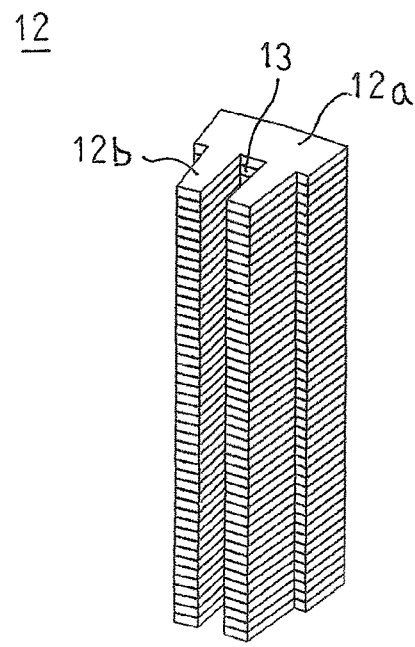
FIG. 4 is an oblique projection that shows a core block that constitutes an armature core in the rotary electric machine according to Embodiment 1 of the present invention.
Figure 5:
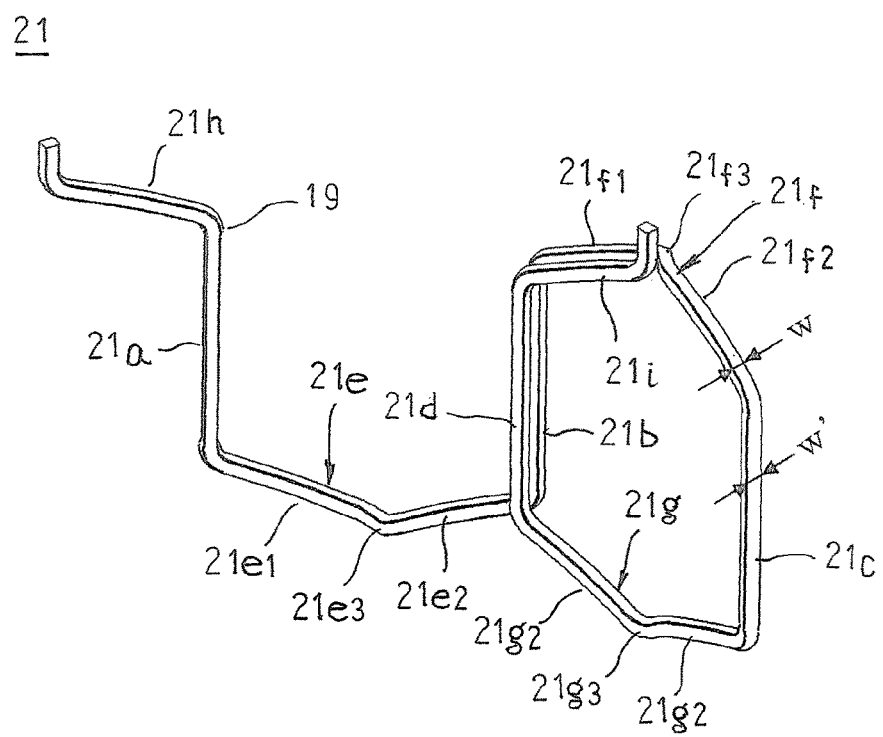
FIG. 5 is an oblique projection that shows a winding body that constitutes an armature winding in the rotary electric machine according to Embodiment 1 of the present invention.
Figure 6:
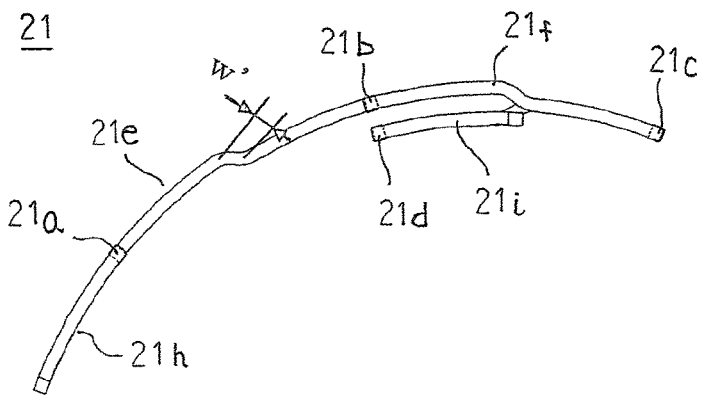
FIG. 6 is an end elevation that shows the winding body that constitutes the armature winding in the rotary electric machine according to Embodiment 1 of the present invention.
Figure 7:
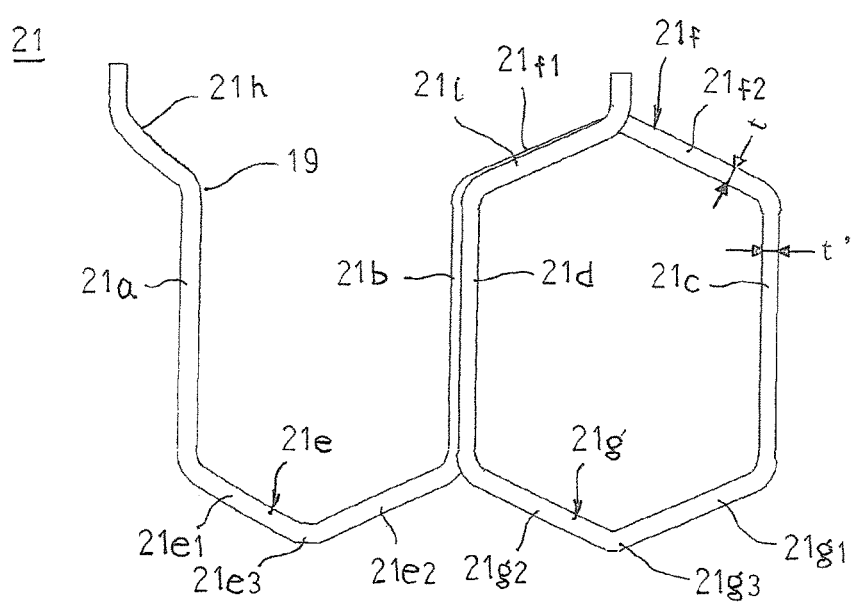
FIG. 7 is a front elevation that shows the winding body that constitutes the armature winding in the rotary electric machine according to Embodiment 1 of the present invention.
Figure 8A:
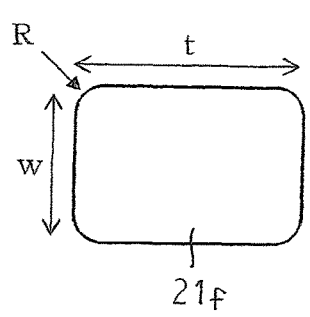
FIGS. 8A and 8B are cross sections that show cross-sectional shapes of a conductor wire that constitutes the winding body in the rotary electric machine according to Embodiment 1 of the present invention.
Figure 8B:
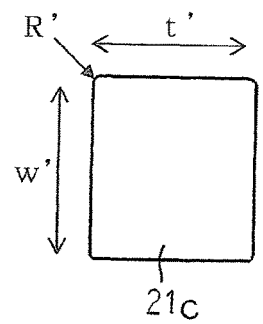

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature in the rotary electric machine according to Embodiment 1 of the present invention, FIG. 4 is an oblique projection that shows a core block that constitutes an armature core in the rotary electric machine according to Embodiment 1 of the present invention, FIG. 5 is an oblique projection that shows a winding body that constitutes an armature winding in the rotary electric machine according to Embodiment 1 of the present invention, FIG. 6 is an end elevation that shows the winding body that constitutes the armature winding in the rotary electric machine according to Embodiment 1 of the present invention, FIG. 7 is a front elevation that shows the winding body that constitutes the armature winding in the rotary electric machine according to Embodiment 1 of the present invention, and FIGS. 8A and 8B are cross sections that show cross-sectional shapes of a conductor wire that constitutes the winding body in the rotary electric machine according to Embodiment 1 of the present invention, FIG. 8A showing the cross-sectional shape of a coil end portion, and FIG. 8B showing the cross-sectional shape of a rectilinear portion of the conductor wire. FIG. 9 is a diagram that explains a mounted state of the winding body onto the armature core in the rotary electric machine according to Embodiment 1 of the present invention.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereon; and permanent magnets 8 that are embedded near an outer circumferential surface of the rotor core 7 so as to be arranged at a uniform pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 9.

As shown in FIG. 3, the armature 10 includes: an armature core 11; an armature winding 20 that is mounted onto the armature core 11; and slot cells 14 that are mounted into slots 13 of the armature core 11. The armature winding 20 is configured by connecting a plurality of winding bodies 21 that are mounted into the armature core 11. The slot cells 14 are formed into U shapes by bending and shaping rectangular sheets that are produced by sandwiching a polyimide film between meta-aramid fibers, for example, and are inserted into the slots 13 to isolate the armature core 11 and the armature winding 20 electrically.

Here, to facilitate explanation, the number of poles in the rotor 5 is ten, the number of slots in the armature core 11 is sixty, and the armature winding 20 is a three-phase winding. In other words, the slots 13 are formed on the armature core 11 at a ratio of two slots per phase per pole.

As shown in FIG. 4, a core block 12 includes: a core back portion 12a that has a circular arc-shaped cross section, that is produced by laminating and integrating thin electromagnetic steel sheets; and two teeth 12b that each project radially inward from an inner circumferential wall surface of the core back portion 12a so as to be separated in a circumferential direction. Thirty core blocks 12 are arranged into an annular shape by abutting together circumferential side surfaces of the core back portions 12a such that the teeth 12b are oriented radially inward, and are integrated to configure the armature core 11. In other words, these core blocks 12 are made by dividing the annular armature core 11 into thirty equal sections circumferentially. The core back portions 12a are arranged into an annular shape circumferentially to constitute the core back of the armature core 11. The slots 13, which are formed by the core back portions 12a and the teeth 12b, are arranged in a row at a uniform angular pitch circumferentially so as to be open on an inner circumferential side. The teeth 12b are formed so as to have a tapered shape in which a circumferential width becomes gradually narrower radially inward, and a cross section of the slots 13 that is perpendicular to the central axis of the armature core 11 is rectangular.

As shown in FIGS. 5 through 7, the winding bodies 21 that constitute the armature winding 20 include: first, second, third, and fourth rectilinear portions 21a, 21b, 21c, and 21d that form three rows so as to be an angular pitch of six slots apart; a first coil end portion 21e that links second longitudinal ends of the first and second rectilinear portions 21a and 21b to each other; a second coil end portion 21f that links first longitudinal ends of the second and third rectilinear portions 21b and 21c to each other; a third coil end portion 21g that links second longitudinal ends of the third and fourth rectilinear portions 21c and 21d to each other; a radially outer terminal 21h that extends from a first longitudinal end of the first rectilinear portion 21a; and a radially inner terminal 21i that extends from a first longitudinal end of the fourth rectilinear portion 21d. The radially outer terminal 21h and the radially inner terminal 21i are connected to other winding bodies 21, power supplying portions, neutral points, etc.

Here, the first coil end portion 21e includes: a pair of inclined portions 21e1 and 21e2; and a top portion 21e3 that links the pair of inclined portions 21e1 and 21e2. The second coil end portion 21f includes: a pair of inclined portions 21f1 and 21f2; and a top portion 21f3 that links the pair of inclined portions 21f1 and 21f2. The third coil end portion 21g includes: a pair of inclined portions 21g1 and 21g2; and a top portion 21g3 that links the pair of inclined portions 21g1 and 21g2.

Moreover, an angular pitch of six slots is a pitch between slot centers of slots 13 on two sides of six consecutive teeth 12b. Thus, in Embodiment 1, in which the slots 13 are formed at a ratio of two slots per phase per pole, and the armature winding 20 is a three-phase winding, an angular pitch of six slots corresponds to a pitch of one magnetic pole.

Specifically, as shown in FIG. 9, the winding bodies 21 are produced into a σ-shaped coil pattern in which a conductor wire 19 that has a rectangular cross section, that is made of jointless continuous copper wire or aluminum wire, and that is insulated using an enamel resin, for example, is inserted into a first layer inside the slots 13 at Slot Number 1 from near a first axial end of the armature core 11, extends outward from the slots 13 at Slot Number 1 at a second axial end of the armature core 11, is inserted into a second layer inside the slots 13 at Slot Number 7, which is separated by an angular pitch of six slots in a first circumferential direction, extends outward from the slots 13 at Slot Number 7 at a second axial end of the armature core 11, is inserted into a third layer inside the slots 13 at Slot Number 13, which is separated by an angular pitch of six slots in the first circumferential direction, extends outward from the slots 13 at Slot Number 13 at the second axial end of the armature core 11, is inserted into a fourth layer inside the slots 13 at Slot Number 7, which is separated by an angular pitch of six slots in the second circumferential direction, and extends outward from the slots 13 at Slot Number 7 at the first axial end of the armature core 11. Moreover, the cross-sectional area perpendicular to the longitudinal direction of the conductor wire 19 is constant in the longitudinal direction. Furthermore, the winding bodies 21 may be produced using a conductor wire that has a circular cross section instead of the conductor wire 19 that has a rectangular cross section.

Here, the first through third coil end portions 21e, 21f, and 21g have a rectangular cross section that has a radial width w and a circumferential width t, as shown in FIG. 8A, and the first through fourth rectilinear portions 21a, 21b, 21c, and 21d, have a rectangular cross section that has a radial width w' and a circumferential width t', as shown in FIG. 8B. Moreover, w'>w, and t>t'. A curvature R of cross-sectional corner portions of the first through third coil end portions 21e, 21f, and 21g is greater than a curvature R' of cross-sectional corner portions of the first through fourth rectilinear portions 21a, 21b, 21c, and 21d. Housed positions of the conductor wire 19 that is housed inside the slots 13 are designated a first layer, a second layer, a third layer, and a fourth layer from radially outside for convenience. In FIGS. 9, 1, 2, . . . 12, and 13 are slot numbers that are allotted to the slots 13 sequentially in a circumferential direction.

The first rectilinear portion 21a is housed in the first layer inside the slots 13 at Slot Number 1, the second and fourth rectilinear portions 21b and 21d are housed in the second layer and the fourth layer inside the slots 13 at Slot Number 7, and the third rectilinear portion 21c is housed in the third layer inside the slots 13 at Slot Number 13. In other words, the first, second, third, and fourth rectilinear portions 21a, 21b, 21c, and 21d are arranged in three columns so as to be separated by an angular pitch of six slots.

The first coil end portion 21e that extends outward at the second axial end of the armature core 11 from the first layer inside the slots 13 at Slot Number 1 maintains its radial position and extends at a constant inclination in the first circumferential direction and axially outward (the inclined portion 21e1), is displaced by w' radially inward at a central portion (the top portion 21e3), and subsequently maintains its radial position and extends at a reverse inclination in the first circumferential direction and axially inward (the inclined portion 21e2) to enter the second layer inside the slots 13 at Slot Number 7.

The second coil end portion 21f that extends outward at the first axial end of the armature core 11 from the second layer inside the slots 13 at Slot Number 7 maintains its radial position and extends at a constant inclination in the first circumferential direction and axially outward (the inclined portion 21f1), is displaced by w' radially inward at a central portion (the top portion 21f3), and subsequently maintains its radial position and extends at a reverse inclination in the first circumferential direction and axially inward (the inclined portion 21f2) to enter the third layer inside the slots 13 at Slot Number 13.

The third coil end portion 21g that extends outward at the second axial end of the armature core 11 from the third layer inside the slots 13 at Slot Number 13 maintains its radial position and extends at a constant inclination in the second circumferential direction and axially outward (the inclined portion 21g1), is displaced by w' radially inward at a central portion (the top portion 21g3), and subsequently maintains its radial position and extends at a reverse inclination in the second circumferential direction and axially inward (the inclined portion 21g2) to enter the fourth layer inside the slots 13 at Slot Number 7.

Thus, the first through third coil end portions 21e, 21f, and 21g have crank portions that displace radially (lane change) by a radial width w' of the first through fourth rectilinear portions 21a, 21b, 21c, and 21d in the radial direction on the top portions 21e3, 21f3, and 21g3.

As shown in FIGS. 6 and 7, the radially outer terminal 21h that extends from the first layer inside the slots 13 at Slot Number 1 at the first axial end of the armature core 11 maintains its radial position, extends in the second circumferential direction and axially outward at a constant inclination, and is bent at a central portion (a top portion) to project radially outward. As shown in FIGS. 6 and 7, the radially inner terminal 21i that extends from the fourth layer inside the slots 13 at Slot Number 7 at the first axial end of the armature core 11 maintains its radial position, extends in the first circumferential direction and axially outward at a constant inclination, and is bent at a central portion (a top portion) to project radially outward.

Figure 12:
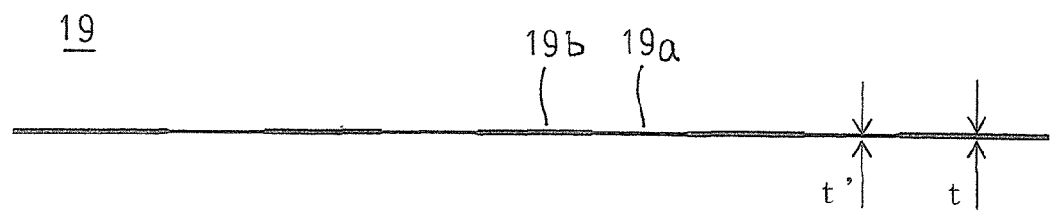
FIG. 12 is a plan that shows the conductor wire that constitutes the winding body in the rotary electric machine according to Embodiment 1 of the present invention.

Next, a manufacturing method for the winding bodies 21 will be explained using FIGS. 10 through 12. FIG. 10 is a plan that shows a conductor strand that constitutes a raw material of the conductor wire that constitutes the winding body in the rotary electric machine according to Embodiment 1 of the present invention, and FIGS. 11A and 11B are cross sections that explain a step of forming a rectilinear portion of the winding body in the rotary electric machine according to Embodiment 1 of the present invention, FIG. 11A showing a state before shaping, and FIG. 11B showing a state after shaping. FIG. 12 is a plan that shows the conductor wire that constitutes the winding body in the rotary electric machine according to Embodiment 1 of the present invention.

As shown in FIG. 10, a conductor strand 23 is first cut to a length that is required in order to produce one winding body 21 from a wire material in which a cross-sectional shape perpendicular to a longitudinal direction is rectangular (w×t), a corner portion curvature is R, and a cross-sectional area is constant in a longitudinal direction. Next, as shown in FIGS. 11A and 11B, a region that corresponds to the first rectilinear portions 21a of the conductor strand 23 is inserted into a die 70, and is crushed to form a deformed portion 19a that has a rectangular cross section that is w'×t', and a corner portion curvature that is R'. In addition, three regions that correspond to the second, third, and fourth rectilinear portions 21b, 21c, and 21d of the conductor strand 23 are sequentially inserted into the die 70, and are crushed to form a rectilinear conductor wire 19 on which four deformed portions 19a are formed, as shown in FIG. 12.

The deformed portions 19a and undeformed portions 19b are arranged alternately in the longitudinal direction on this rectilinear conductor wire 19. The four deformed portions 19a respectively correspond to the first through fourth rectilinear portions 21a, 21b, 21c, and 21d. The five undeformed portions 19b respectively correspond to the radially outer terminal 21h, the first through third coil end portions 21e, 21f, and 21g, and the radially inner terminal 21i. Next, the conductor wire 19 bent into a σ shape, and the crank shapes at the top portions of the coil end portions and the inclined portions of the coil end portions are formed to produce the winding body 21 that is shown in FIGS. 5 through 7.

Figure 13:
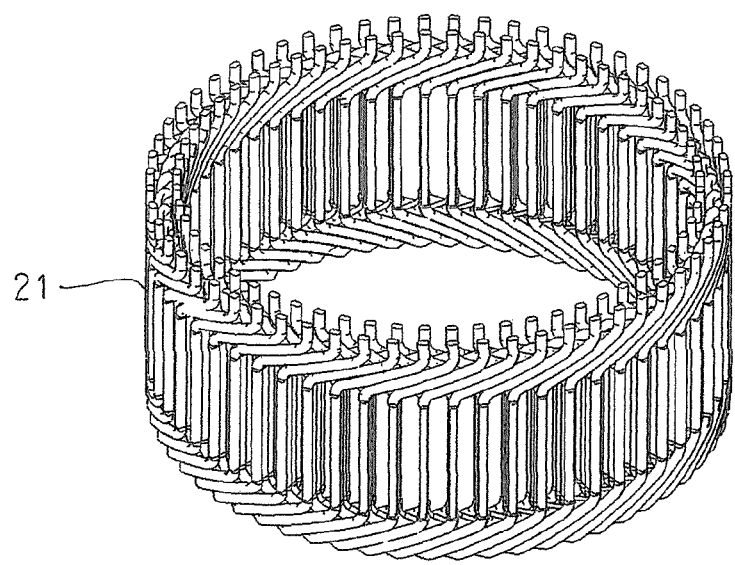
FIG. 13 is an oblique projection that shows a winding assembly in the rotary electric machine according to Embodiment 1 of the present invention.
Figure 14:
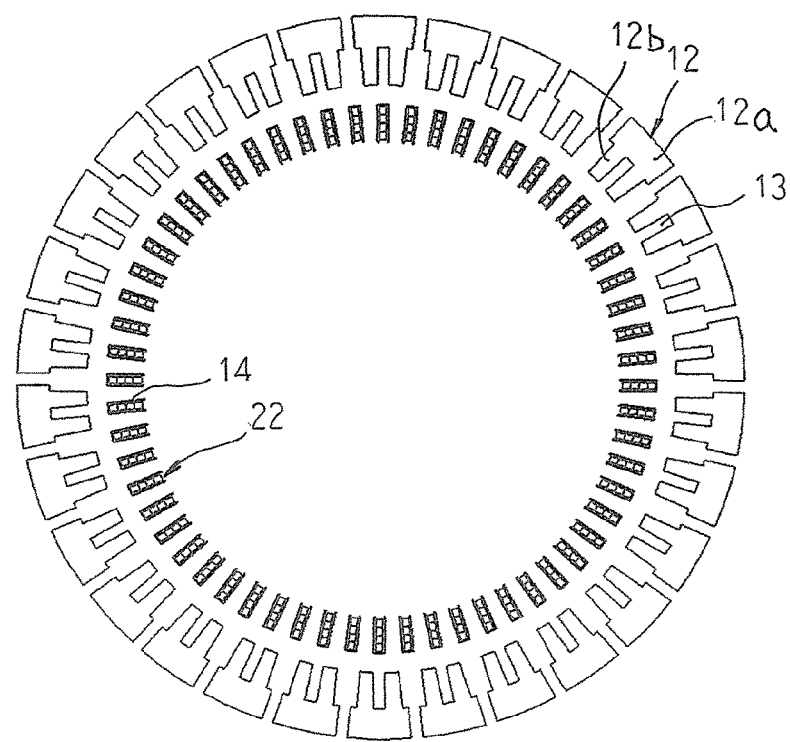
FIG. 14 is a diagram that explains a method for assembling the armature in the rotary electric machine according to Embodiment 1 of the present invention.
Figure 15:
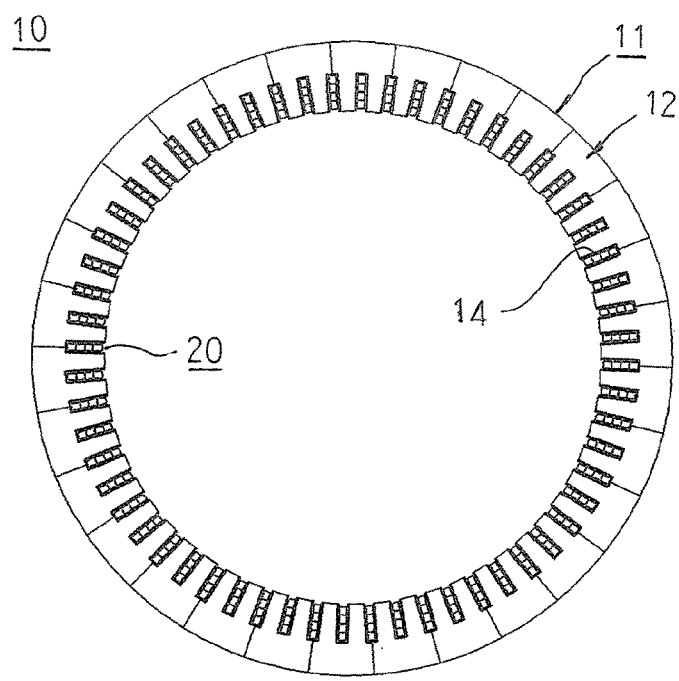
FIG. 15 is a diagram that explains the method for assembling the armature in the rotary electric machine according to Embodiment 1 of the present invention.
Figure 16:
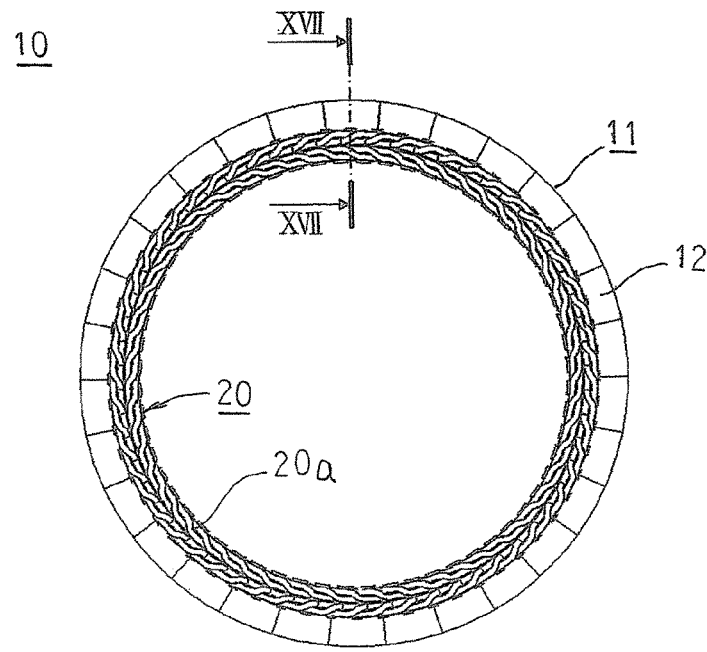
FIG. 16 is a diagram that explains the method for assembling the armature in the rotary electric machine according to Embodiment 1 of the present invention.
Figure 17:
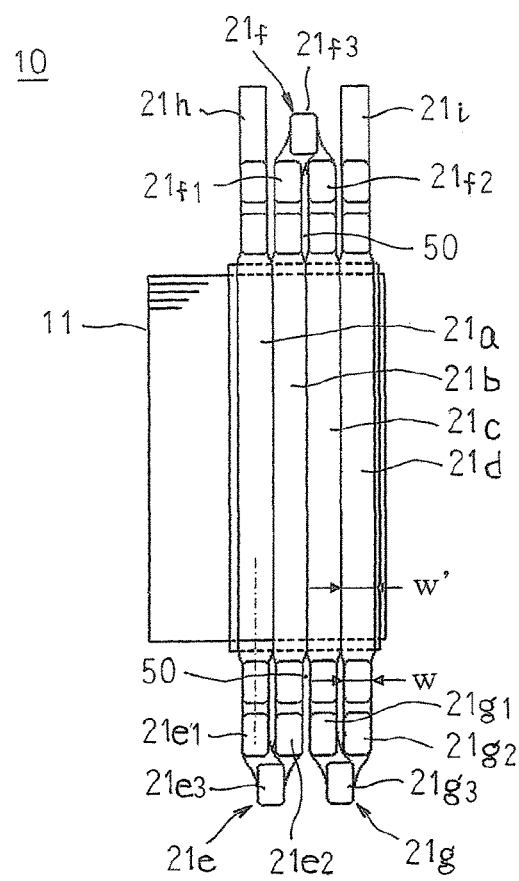
FIG. 17 is a cross section that is taken along Line XVII-XVII in FIG. 16 so as to be viewed in the direction of the arrows.
Figure 18:
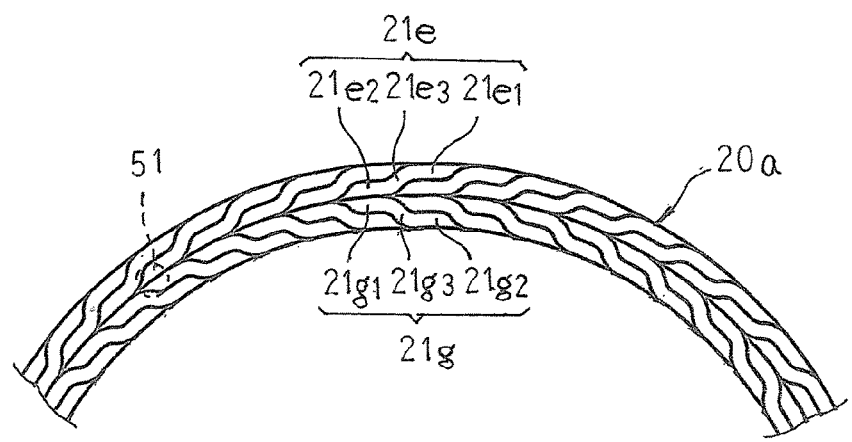
FIG. 18 is a partial end elevation that shows a coil end of the armature in the rotary electric machine according to Embodiment 1 of the present invention.

Next, a method for mounting the winding bodies 21 onto the armature core 11 will be explained with reference to FIGS. 13 through 18. FIG. 13 is an oblique projection that shows a winding assembly in the rotary electric machine according to Embodiment 1 of the present invention, and FIGS. 14 through 16 are diagrams that explain a method for assembling the armature in the rotary electric machine according to Embodiment 1 of the present invention, FIG. 14 showing a state before assembly of the armature, and FIGS. 15 and 16 showing a state after assembly of the armature. FIG. 17 is a cross section that is taken along Line XVII-XVII in FIG. 16 so as to be viewed in the direction of the arrows, and FIG. 18 is a partial end elevation that shows a coil end of the armature in the rotary electric machine according to Embodiment 1 of the present invention. Moreover, in FIGS. 14 and 15, a winding assembly 22 is represented using only the first through fourth rectilinear portions 21a, 21b, 21c, and 21d for convenience.

Sixty winding bodies 21 are arranged circumferentially at a pitch of one slot to produce the annular winding assembly 22 that is shown in FIG. 13. In this winding assembly 22, the first through fourth rectilinear portions 21a, 21b, 21c, and 21d are arranged in sixty columns at a pitch of one slot circumferentially so as to have the width w' of the rectangular cross sections as their radial widths such that rectilinear portion columns are arranged in single columns radially. The second coil end portions 21f are arranged circumferentially at a pitch of one slot at a first axial end of the winding assembly 22 to constitute first coil ends. The radially outer terminals 21h and the radially inner terminals 21i are arranged circumferentially at a pitch of one slot on an outer circumferential side and an inner circumferential side, respectively, of the first coil ends. At a second axial end of the winding assembly 22, a layer that is formed by arranging the first coil end portions 21e circumferentially at a pitch of one slot and a layer that is formed by arranging the third coil end portions 21g circumferentially at a pitch of one slot line up in two layers in a radial direction to constitute second coil ends.

Next, the slot cells 14 are mounted onto each of the rectilinear portion columns of the first through fourth rectilinear portions 21a, 21b, 21c, and 21d. Next, thirty core blocks 12 are arranged at a uniform angular pitch circumferentially such that respective teeth are positioned on a radially outer side between adjacent rectilinear portion columns of the winding assembly 22, as shown in FIG. 14. Next, the core blocks 12 that are arranged in a row circumferentially are moved radially inward. The respective teeth 12b of the core blocks 12 are thereby inserted between the adjacent rectilinear portion columns.

Then, when the core blocks 12 that are arranged in a row circumferentially are moved further radially inward, the circumferential side surfaces of the adjacent core blocks 12 are abutted with each other, preventing radially inward movement of the core blocks 12. The winding assembly 22 is thereby mounted onto the armature core 11, as shown in FIGS. 15 through 17. Alternating-current connection is then applied to the winding assembly 22 to configure the armature winding 20, producing the armature 10.

In an armature winding 20 that is configured in this manner, the first coil end portions 21e and the third coil end portions 21g of winding bodies 21 that constitute identical phases are radially adjacent. The first coil end portions 21e and the third coil end portions 21g are lane changed at the top portions 21e3 and 21g3 by w' radially such that the inclined portions 21e2 and 21g1 are closer together, and the inclined portions 21e1 and 21g2 are further apart. Pairs of first coil end portions 21e and third coil end portions 21g are arranged circumferentially at a pitch of one slot to constitute coil ends 20a. As shown in FIG. 18, recess portions 51 are thereby formed in a vicinity of the top portions 21e3 and 21g3 between circumferentially adjacent pairs of first and third coil end portions 21e and 21g.

According to Embodiment 1, a radial width w' of first through fourth rectilinear portions 21a, 21b, 21c, and 21d is wider than a radial width w of first through third coil end portions 21e, 21f, and 21g, radially outer terminals 21h, and radially inner terminals 21i. Thus, as shown in FIG. 17, the first through third coil end portions 21e, 21g, and 21f, the radially outer terminals 21h, and the radially inner terminals 21i are arranged in a rows in a radial direction so as to be separated from each other. Consequently, gaps 50 are formed between the conductor wires 21 of the coil ends, enabling the insulating distance between the phases to be ensured. Thus, it is not necessary to increase the thickness of the insulating coatings that are coated onto the first through third coil end portions 21e, 21g, and 21f, the radially outer terminals 21h, and the radially inner terminals 21i, enabling enlargement of the radial dimensions of the coil ends to be suppressed. Furthermore, steps such as partially increasing the thickness of the insulating coatings of the conductor wires 19 are no longer necessary, enabling increases in manufacturing costs of the conductor wire 19 to be suppressed.

Figure 19:
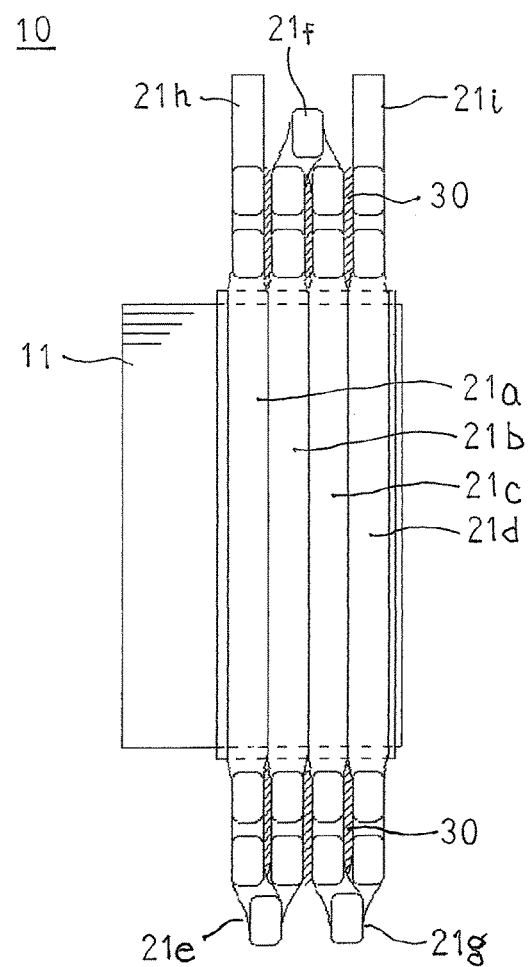
FIG. 19 is a partial cross section that shows a state of flow of a cooling medium in the armature of the rotary electric machine according to Embodiment 1 of the present invention.

In this rotary electric machine 100, cooling of the armature 10 is performed using a cooling medium 30 such as air, automatic transmission fluid (ATF oil), engine oil, etc. In this armature 10, gaps are formed between the conductor wire 21 of the coil ends. Thus, as shown in FIG. 19, the cooling medium 30 flows through the gaps between the conductor wires 21, enabling the coil ends to be cooled effectively.

Recess portions 51 are formed in a vicinity of the top portions 21e3 and 21g3 between pairs of circumferentially adjacent first and third coil end portions 21e and 21g. Thus, in the case of air cooling, cooling of the coil ends is facilitated by turbulence effects in the recess portions 51. In the case of oil cooling, cooling of the coil ends is facilitated because oil enters the recess portions 51 and dwells inside the recess portions 51.

Embodiment 2

Figure 20:
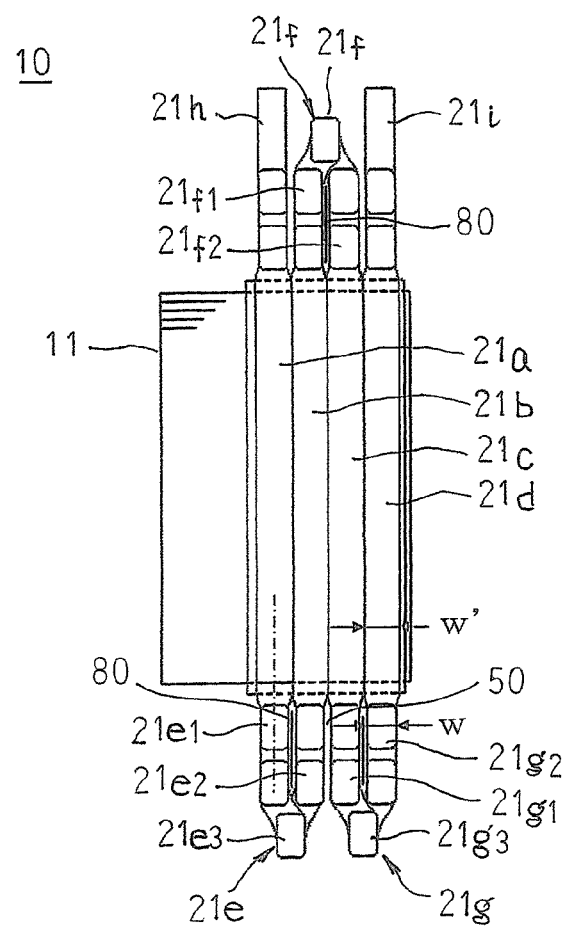
FIG. 20 is a partial cross section that shows an armature in a rotary electric machine according to Embodiment 2 of the present invention.

FIG. 20 is a partial cross section that shows an armature in a rotary electric machine according to Embodiment 2 of the present invention.

In FIG. 20, insulating sheets 80 are respectively inserted into gaps 50 between inclined portions 21e1 that extend from first rectilinear portions 21a to top portions 21e3 of first coil end portions 21e and inclined portions 21e2 that extend from second rectilinear portions 21b to the top portions 21e3, gaps 50 between inclined portions 21f1 that extend from the second rectilinear portions 21b to top portions 21f3 of first coil end portions 21f and inclined portions 21f2 that extend from third rectilinear portions 21c to the top portions 21f3, and gaps 50 between inclined portions 21g1 that extend from the third rectilinear portions 21c to top portions 21g3 of first coil end portions 21g and inclined portions 21g2 that extend from fourth rectilinear portions 21d to the top portions 21g3.

Moreover, the rest of the configuration is formed in a similar or identical manner to that of Embodiment 1 above.

In Embodiment 2, insulating sheets 80 are disposed on crossing portions between inclined portions 21e1 that extend from first rectilinear portions 21a to top portions 21e3 of first coil end portions 21e and inclined portions 21e2 that extend from second rectilinear portions 21b to the top portions 21e3 of different phase coils.

Insulating sheets 80 are disposed on crossing portions between inclined portions 21f1 that extend from the second rectilinear portions 21b to top portions 21f3 of first coil end portions 21f and inclined portions 21f2 that extend from third rectilinear portions 21c to the top portions 21f3 of different phase coils. Insulating sheets 80 are disposed on crossing portions between inclined portions 21g1 that extend from the third rectilinear portions 21c to top portions 21g3 of first coil end portions 21g and inclined portions 21g2 that extend from fourth rectilinear portions 21d to the top portions 21g3 of different phase coils.

Thus, according to Embodiment 2, because insulating sheets 80 are disposed between coil end portions of coils that have different phases, i.e., between coil end portions that have larger electric potential differences, the phases can be insulated more reliably from each other. Thus, the applied voltage can be increased, enabling high output to be achieved.

Insulating sheets 80 are not disposed between coil end portions of coils that have identical phases, which have smaller electric potential differences. Thus, the number of parts is reduced, enabling cost reductions to be achieved.

Because gaps between the first coil end portions 21e and the third coil end portions 21g, and gaps between winding ends 21h and 21i and the second coil end portions 21f are ensured, a cooling medium flows through the gaps between the conductor wires 21, enabling the coil ends to be cooled effectively. In addition, because recess portions 51 are formed in a vicinity of the top portions 21e3 and 21g3 between pairs of circumferentially adjacent first and third coil end portions 21e and 21g, cooling of the coil ends is facilitated.

Embodiment 3

Figure 21:
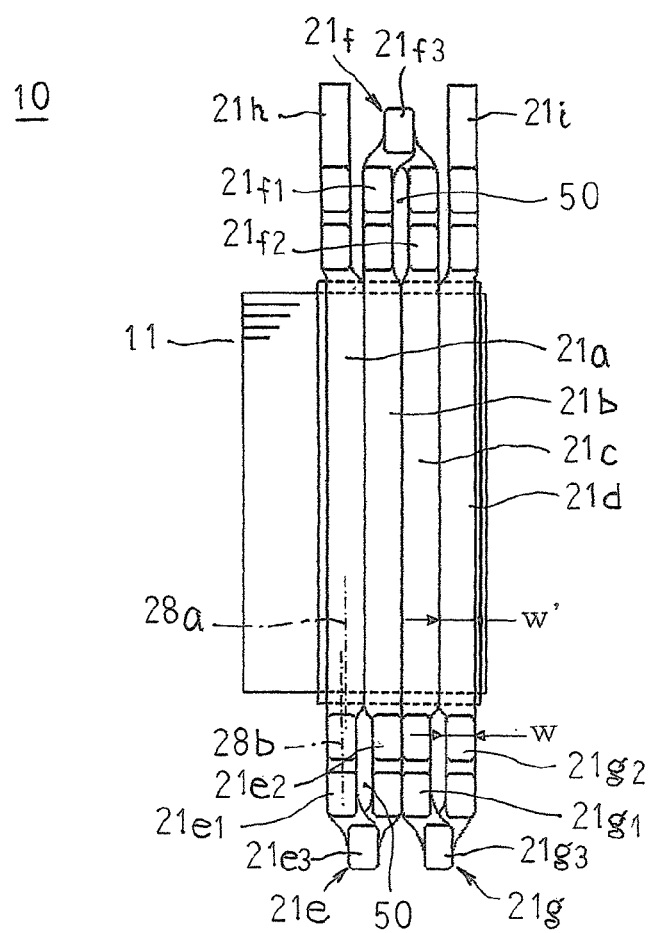
FIG. 21 is a partial cross section that shows an armature in a rotary electric machine according to Embodiment 3 of the present invention.
Figure 22:
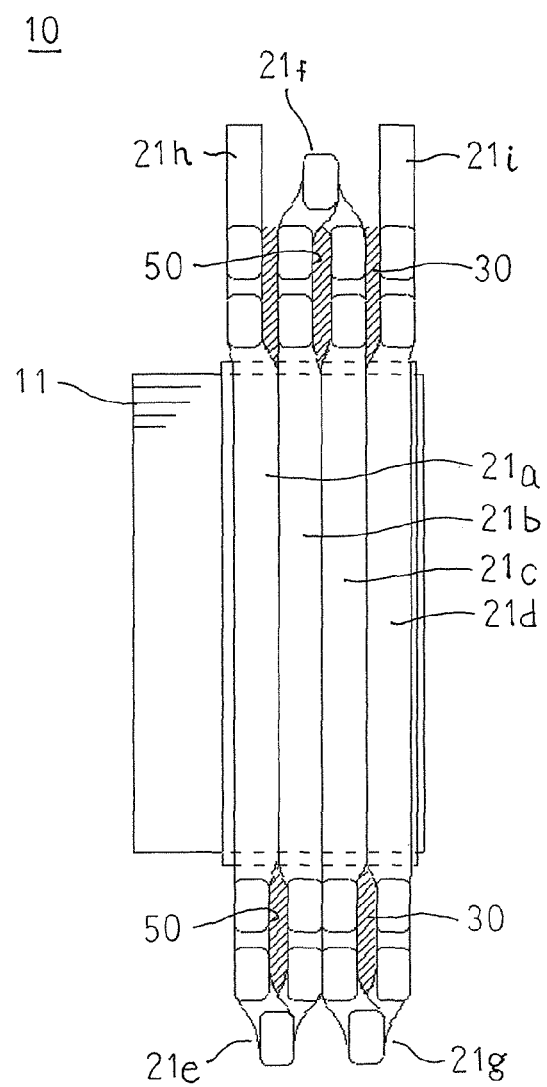
FIG. 22 is a partial cross section that shows a state of flow of a cooling medium in the armature of the rotary electric machine according to Embodiment 3 of the present invention.

FIG. 21 is a partial cross section that shows an armature in a rotary electric machine according to Embodiment 3 of the present invention, and FIG. 22 is a partial cross section that shows a state of flow of a cooling medium in the armature of the rotary electric machine according to Embodiment 3 of the present invention.

In FIG. 21, radial positions 28b of conductor centers of inclined portions 21e1 of first coil end portions 21e that extend from first rectilinear portions 21a to top portions 21e3 are displaced radially outward relative to radial positions 28a of conductor centers of the first rectilinear portions 21a, and radial positions of conductor centers of inclined portions 21e2 of the first coil end portions 21e that extend from the top portions 21e3 to second rectilinear portions 21b are displaced radially inward relative to radial positions of conductor centers of the second rectilinear portions 21b. Radial positions of conductor centers of inclined portions 21f1 of second coil end portions 21f that extend from the second rectilinear portions 21b to top portions 21f3 are displaced radially outward relative to radial positions of conductor centers of the second rectilinear portions 21b, and radial positions of conductor centers of inclined portions 21f2 of the second coil end portions 21f that extend from the top portions 21f3 to third rectilinear portions 21c are displaced radially inward relative to radial positions of conductor centers of the third rectilinear portions 21c. Radial positions of conductor centers of inclined portions 21g1 of third coil end portions 21g that extend from the third rectilinear portions 21c to top portions 21g3 are displaced radially outward relative to radial positions of conductor centers of the third rectilinear portions 21c, and radial positions of conductor centers of inclined portions 21g2 of the third coil end portions 21g that extend from the top portions 21g3 to fourth rectilinear portions 21d are displaced radially inward relative to radial positions of conductor centers of the fourth rectilinear portions 21d.

Moreover, the rest of the configuration is formed in a similar or identical manner to that of Embodiment 1 above.

According to Embodiment 3, gaps 50 between inclined portions 21e1 and 21e2 on two sides of top portions 21e3 of first coil end portions 21e are ensured to be wide. Similarly, gaps 50 between inclined portions 21f1 and 21f2 on two sides of top portions 21f3 of second coil end portions 21f are ensured to be wide, and gaps 50 between inclined portions 21g1 and 21g2 on two sides of top portions 21g3 of third coil end portions 21g are ensured to be wide. Thus, insulating distance between phases can be ensured to be even wider. Large gaps 50 are also formed between the conductor wires 21 of the coil ends. Thus, as shown in FIG. 22, the cooling medium 30 can flow through the gaps 50 between the conductor wires 21 more easily, facilitating cooling of the coil ends.

Embodiment 4

Figure 23:
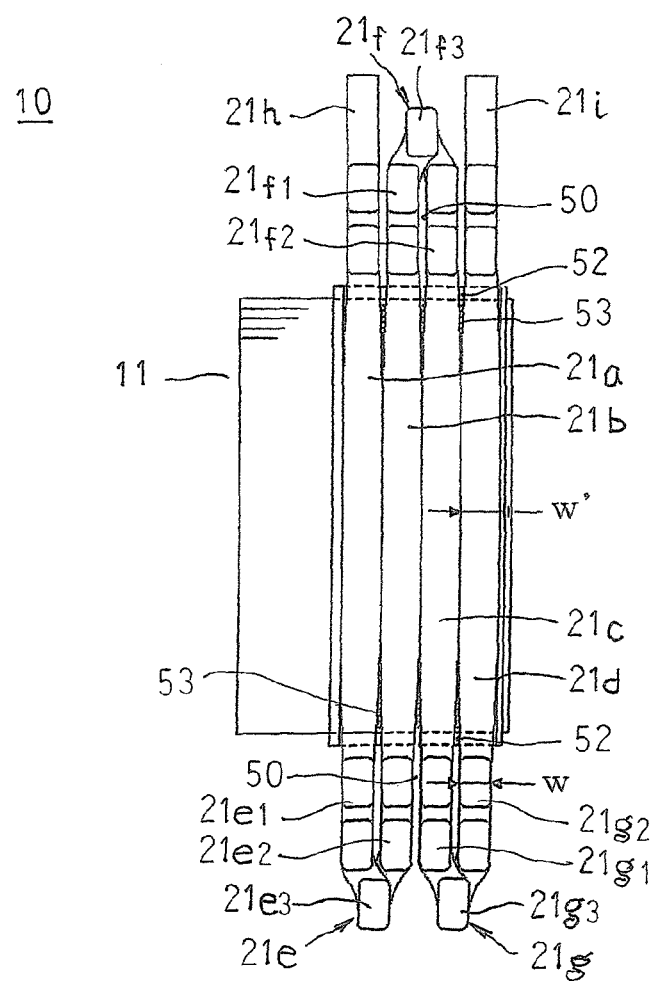
FIG. 23 is a partial cross section that shows an armature in a rotary electric machine according to Embodiment 4 of the present invention.
Figure 24:
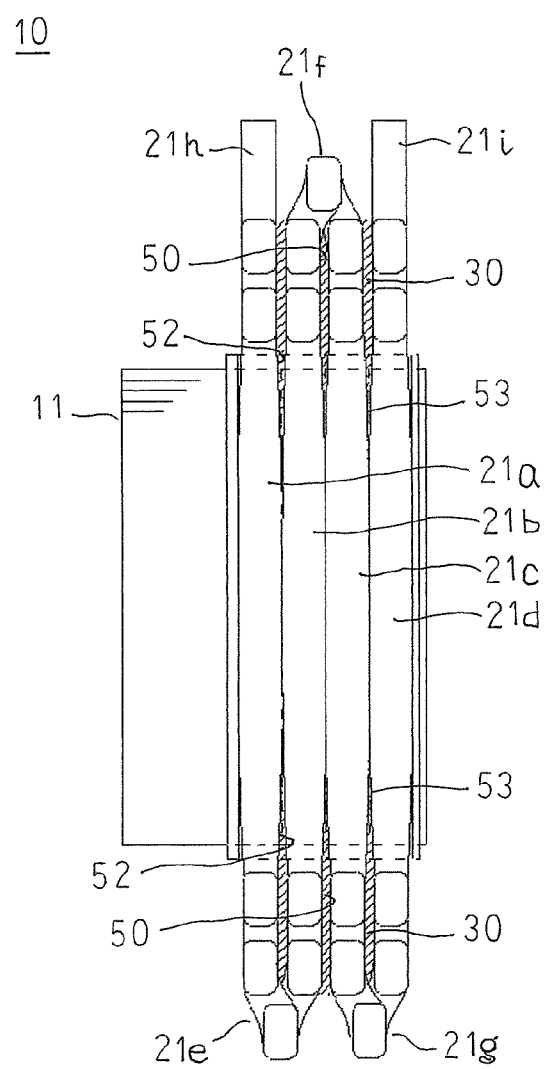
FIG. 24 is a partial cross section that shows a state of flow of a cooling medium in the armature of the rotary electric machine according to Embodiment 4 of the present invention.

FIG. 23 is a partial cross section that shows an armature in a rotary electric machine according to Embodiment 4 of the present invention, and FIG. 24 is a partial cross section that shows a state of flow of a cooling medium in the armature of the rotary electric machine according to Embodiment 4 of the present invention.

In FIG. 23, first rectilinear portions 21a are formed such that radial widths are at a maximum value (w') except for two longitudinal end regions, the radial widths become narrower toward two end portions in the two longitudinal end regions, and are at a minimum value (w=the radial widths of the first through third coil end portions 21e, 21f, and 21g) at the two end portions. Second through fourth rectilinear portions 21b, 21c, 21d are also formed in a similar manner.

Moreover, the rest of the configuration is formed in a similar or identical manner to that of Embodiment 1 above.

According to Embodiment 4, radial widths of first through fourth rectilinear portions 21a, 21b, 21c, and 21d are reduced monotonically from longitudinally central portions toward two end portions. Thus, because gaps 52 are formed in the slots between the first through fourth rectilinear portions 21a, 21b, 21c, and 21d, a varnish 53 can be reliably impregnated between the first through fourth rectilinear portions 21a, 21b, 21c, and 21d. Furthermore, because the gaps 52 are formed in the slots between the first through fourth rectilinear portions 21a, 21b, 21c, and 21d, the cooling medium 30 flows into the gaps 52 in the slots as shown in FIG. 24, enabling the first through fourth rectilinear portions 21a, 21b, 21c, and 21d to be cooled. In addition, because recess portions 51 are formed in a vicinity of the top portions 21e3 and 21g3 between pairs of circumferentially adjacent first and third coil end portions 21e and 21g, cooling of the coil ends is facilitated.

Moreover, in Embodiment 4 above, radial widths of the first through fourth rectilinear portions are tapered so as to become gradually narrower only in two longitudinal end regions, but the radial widths of the first through fourth rectilinear portions may be made so as to have a tapered shape that becomes gradually narrower from longitudinally central portions toward the two end portions.

Embodiment 5

Figure 25:
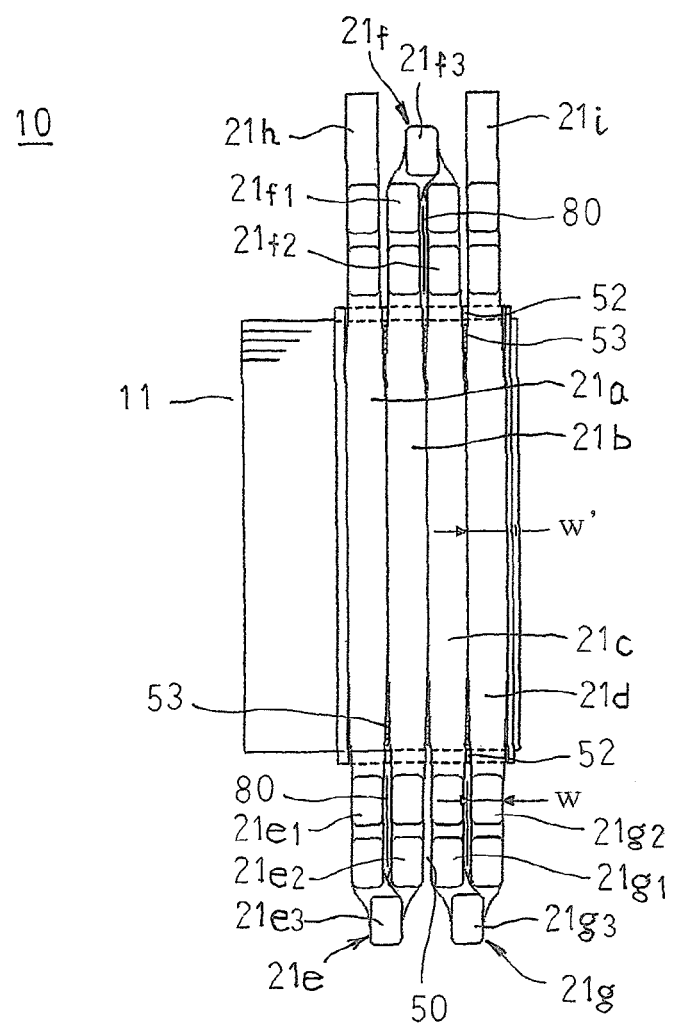
FIG. 25 is a partial cross section that shows an armature in a rotary electric machine according to Embodiment 5 of the present invention.

FIG. 25 is a partial cross section that shows an armature in a rotary electric machine according to Embodiment 5 of the present invention.

In FIG. 25, insulating sheets 80 are respectively inserted into gaps 50 between inclined portions 21e1 that extend from first rectilinear portions 21a to top portions 21e3 of first coil end portions 21e and inclined portions 21e2 that extend from second rectilinear portions 21b to the top portions 21e3, gaps 50 between inclined portions 21f1 that extend from the second rectilinear portions 21b to top portions 21f3 of first coil end portions 21f and inclined portions 21f2 that extend from third rectilinear portions 21c to the top portions 21f3, and gaps 50 between inclined portions 21g1 that extend from the third rectilinear portions 21c to top portions 21g3 of first coil end portions 21g and inclined portions 21g2 that extend from fourth rectilinear portions 21d to the top portions 21g3.

Moreover, the rest of the configuration is formed in a similar or identical manner to that of Embodiment 4 above.

In Embodiment 5, insulating sheets 80 are disposed on crossing portions between inclined portions 21e1 that extend from first rectilinear portions 21a to top portions 21e3 of first coil end portions 21e and inclined portions 21e2 that extend from second rectilinear portions 21b to the top portions 21e3 of different phase coils. Insulating sheets 80 are disposed on crossing portions between inclined portions 21f1 that extend from the second rectilinear portions 21b to top portions 21f3 of first coil end portions 21f and inclined portions 21f2 that extend from third rectilinear portions 21c to the top portions 21f3 of different phase coils. Insulating sheets 80 are disposed on crossing portions between inclined portions 21g1 that extend from the third rectilinear portions 21c to top portions 21g3 of first coil end portions 21g and inclined portions 21g2 that extend from fourth rectilinear portions 21d to the top portions 21g3 of different phase coils.

Thus, according to Embodiment 5, because insulating sheets 80 are disposed between coil end portions of coils that have different phases, i.e., between coil end portions that have larger electric potential differences, the phases can be insulated more reliably from each other. Thus, the applied voltage can be increased, enabling high output to be achieved.

Insulating sheets 80 are not disposed between coil end portions of coils that have identical phases, which have smaller electric potential differences. Thus, the number of parts is reduced, enabling cost reductions to be achieved. Because gaps 50 between the first coil end portions 21e and the third coil end portions 21g, and gaps 50 between winding ends 21h and 21i and the second coil end portions 21f are ensured, a cooling medium flows through the gaps 50 between the conductor wires 21, enabling the coil ends to be cooled effectively. In addition, because recess portions 51 are formed in a vicinity of the top portions 21e3 and 21g3 between pairs of circumferentially adjacent first and third coil end portions 21e and 21g, cooling of the coil ends is facilitated.

Moreover, in each of the above embodiments, a ten-pole, sixty-slot rotary electric machine has been explained, but the number of poles and the number of slots are not limited to ten poles and sixty slots.

In each of the above embodiments, slots are formed at a ratio of two slots per phase per pole, but the number of slots per phase per pole is not limited to two, and may be one, or may be three or greater. In the case of a winding in which the number of slots per phase per pole is one, and the winding bodies are full-pitch windings, for example, the pitch between the rectilinear portions that are linked by the coil end portions will be an angular pitch of three slots (a pitch of one magnetic pole).

In each of the above embodiments, the winding bodies are formed into full-pitch windings, but the winding bodies may be configured into short-pitch windings or long-pitch windings.

In each of the above embodiments, the winding bodies are produced by winding conductor wires once into a σ-shaped coil pattern, but winding bodies may be produced by winding conductor wires into a σ-shaped coil pattern continuously for two or more turns.

In each of the above embodiments, the winding bodies are produced by winding conductor wires into a σ-shaped coil pattern, but the winding bodies are not limited to σ-shaped coil pattern windings provided that they are distributed windings, and may be hexagonal windings that are produced by winding conductor wires helically, or wave windings that are produced by winding conductor wires into wave windings, for example.

What is claimed is:

1. A rotary electric machine comprising an armature that includes:
    an annular armature core in which slots are arranged circumferentially; and
    an armature winding that is mounted onto said armature core,
    wherein:
    said armature winding includes a plurality of distributed winding bodies that are each produced by winding a single conductor wire that is insulated, jointless, continuous, and that has a constant cross-sectional area perpendicular to a longitudinal direction;
    said conductor wires are configured by alternately arranging rectilinear portions and coil end portions in a longitudinal direction of said conductor wires, said rectilinear portions being inserted into said slots, and said coil end portions linking pairs of rectilinear portions inserted into said slots positioned on two sides of a plurality of circumferentially consecutive teeth;
    a plurality of said rectilinear portions are housed inside said slots so as to line up in a single column in a radial direction;
    a radial width of said rectilinear portions is formed so as to be wider than a radial width of said coil end portions along the length of the coil end portions;
    a first gap is formed between radially adjacent coil end portions to allow a cooling medium to pass through said first gap; and
    said coil end portions include:
        a top portion that is separated axially from an end surface of said armature core; and
        an inclined portion that extends outward from said rectilinear portions and maintains a radial position to reach said top portion;
    said inclined portions that are radially adjacent to inclined portions of coil end portions of a different phase are displaced in a direction in which radial positions of conductor centers are set further away from said inclined portions of said coil end portions of said different phase than radial positions of conductor centers of said rectilinear portions from which said inclined portions extend outward;
    said inclined portions that are radially adjacent to inclined portions of coil end portions of an identical phase are displaced in a direction in which radial positions of conductor centers are set closer to said inclined portions of said coil end portions of said identical phase than radial positions of conductor centers of said rectilinear portions from which said inclined portions extend outward;
    said first gap that is formed between said radially adjacent coil end portions of said different phases is wider than said first gap that is formed between said radially adjacent coil end portions of said identical phases; and
    an angular orientation of each of the radially adjacent coil end portions remains constant along the length of the coil end portions.

2. The rotary electric machine according to claim 1, wherein:
    pairs of said coil end portions that have identical phases and are radially adjacent are formed so as to be lane changed at top portions so as to be separated on a first circumferential side of said top portions, and set close together on a second circumferential side of said top portions, and are arranged circumferentially; and
    a recess portion is formed between said top portions of circumferentially adjacent pairs of said coil end portions.

3. The rotary electric machine according to claim 1, wherein an insulating sheet is inserted between said coil end portions that have different phases and are radially adjacent.

4. The rotary electric machine according to claim 1, wherein a circumferential width of said coil end portions is formed so as to be wider than a circumferential width of said rectilinear portions.

5. The rotary electric machine according to claim 4, wherein the circumferential width of said coil end portions is formed so as to be wider than the circumferential width of said rectilinear portions along the length of said coil end portions.

6. A rotary electric machine comprising an armature that includes:
    an annular armature core in which slots are arranged circumferentially; and
    an armature winding that is mounted onto said armature core,
    wherein:
    said armature winding includes a plurality of distributed winding bodies that are each produced by winding a single conductor wire that is insulated, jointless, continuous, and that has a constant cross-sectional area perpendicular to a longitudinal direction;
    said conductor wires are configured by alternately arranging rectilinear portions and coil end portions in a longitudinal direction of said conductor wires, said rectilinear portions being inserted into said slots, and said coil end portions linking pairs of rectilinear portions inserted into said slots positioned on two sides of a plurality of circumferentially consecutive teeth;

a plurality of said rectilinear portions are housed inside said slots so as to line up in a single column in a radial direction;

a radial width of said rectilinear portions is formed so as to be wider than a radial width of said coil end portions;

a first gap is formed between radially adjacent coil end portions to allow a cooling medium to pass through said first gap;

said rectilinear portions that are inserted into said slots are formed so as to be reduced monotonically from longitudinally central portions of said rectilinear portions toward two end portions such that radial widths thereof are at a maximum at said longitudinally central portions of said rectilinear portions, and become equal to radial widths of said coil end portions at said two longitudinal end portions of said rectilinear portions, whereby a second gap is formed inside said slots between radially adjacent rectilinear portions; and said cooling medium is passed through said second gap.

7. The rotary electric machine according to claim 6, wherein a varnish is impregnated into said slots.

8. The rotary electric machine according to claim 6, wherein:

pairs of said coil end portions that have identical phases and are radially adjacent are formed so as to be lane changed at top portions so as to be separated on a first circumferential side of said top portions, and set close together on a second circumferential side of said top portions, and are arranged circumferentially; and a recess portion is formed between said top portions of circumferentially adjacent pairs of said coil end portions.

* * * * *